(No Model.)
I. M. WARNER.
VEHICLE HUB.
No. 473,596. Patented Apr. 26, 1892.
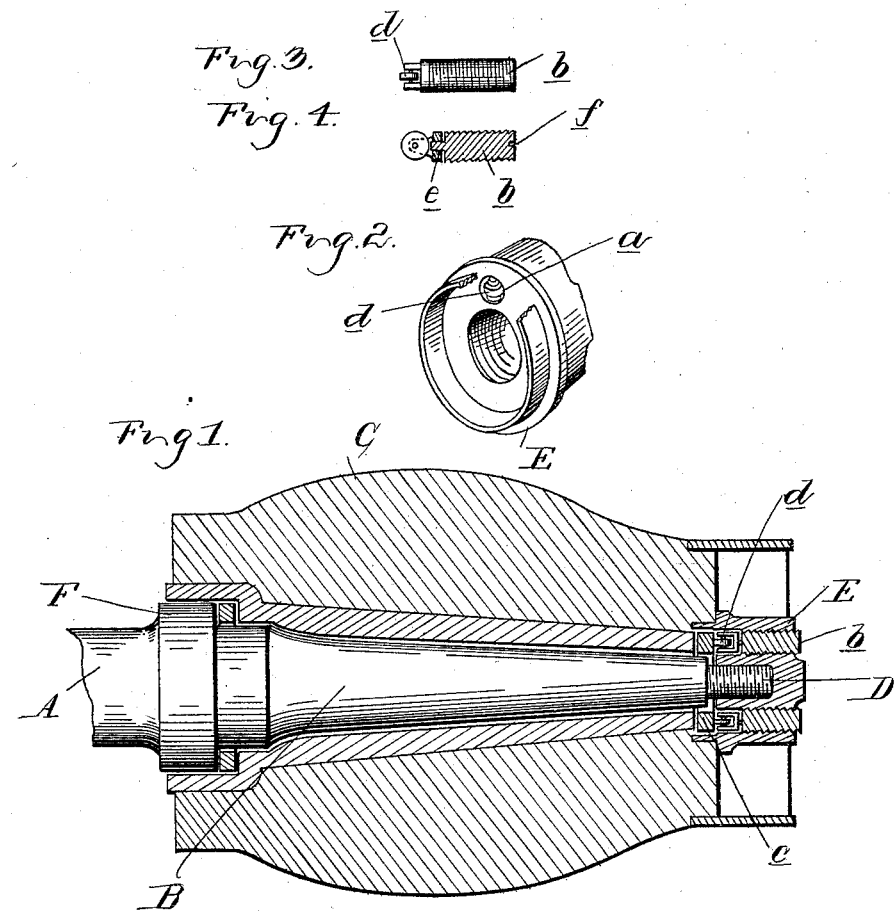
Witnesses
A. L. Kobbie
M. B. O'Dogherty
Inventor
Isaac M. Warner
By Thos. S. Sprague & Son
Attys.

UNITED STATES PATENT OFFICE.

ISAAC M. WARNER, OF BRONSON, MICHIGAN.

VEHICLE-HUB.

SPECIFICATION forming part of Letters Patent No. 473,596, dated April 26, 1892.

Application filed December 19, 1891. Serial No. 415,605. (No model.)

*To all whom it may concern:*

Be it known that I, ISAAC M. WARNER, a citizen of the United States, residing at Bronson, in the county of Branch and State of Michigan, have invented certain new and useful Improvements in Vehicle-Hubs, of which the following is a specification, reference being had therein to the accompanying drawings.

This invention relates to new and useful improvements in nuts for carriage-axles; and it consists in the peculiar construction of a nut designed to hold a carriage-wheel upon the journal, with means for taking up the end wear without the necessity of inserting new washers, as is ordinarily done, and whereby there is the least possible friction between the stationary nut and the revolving part of the wheel, all as more fully hereinafter described.

In the drawings, Figure 1 is a vertical central longitudinal section through a vehicle-hub to which my invention is applied. Fig. 2 is a detached perspective view of the nut. Fig. 3 is an elevation of one of the adjusting-screws. Fig. 4 is a longitudinal section through the same.

A is the vehicle-axle; B, the journal formed at the end thereof; C, the hub having a suitable skein engaging upon the journal; D, the reduced screw-threaded portion at the end of the journal, and E the screw-nut engaging said reduced end portion, these parts being all of known and usual construction, except as hereinafter described. At the present time it is necessary in taking up the end wear of vehicle-wheels to insert leather or other washers between the nut and the hub and between the inner end of the hub and the collar F upon the axle. These washers wear out very quickly, and therefore require constant and frequent renewal, and in replacing such washers with new ones it frequently happens that the nut is not turned up to a stop, and in backing the vehicle the nuts will come off, causing damage to arise.

My construction enables me to screw the nut onto the reduced portion and to its fullest extent, so that there is no possibility of its becoming loose, and then without removing the nut take up the wear in the washers to prevent end motion. To accomplish this I make one or more screw-threaded apertures $a$ through the nut, preferably upon opposite sides thereof, in which I place adjusting-screws $b$, extending from the outside to the inside thereof and adapted to bear either against the end of the skein of the axle or against the outer face of the metallic washer $c$. Instead of allowing the end of the adjusting-screw $b$ to bear against this washer, thereby causing undue friction of the parts in the use of the vehicle, I form at the end of these screws a suitable roller or ball bearing which bears against the washer, greatly reducing the friction. This I have shown as consisting of a caster $d$, swiveled upon a pin $e$ upon the end of the screw, the caster-wheel bearing against the washer, as shown in Fig. 1. In place of this it is evident that a ball may be introduced in a socket in the end of a screw as an equivalent.

$f$ is the usual socket or slot in the end of the screw for adjusting the same after the nut has been applied to the wheel.

What I claim as my invention is—

1. The combination, with a carriage journal and axle and a wheel thereon, of a nut for holding said wheel upon the journal, screws passing through said nut, and a universal roller-bearing on the inner end of said screws, the parts combined as and for the purpose described.

2. The combination, with a carriage-journal and a wheel thereon, of a nut for holding said wheel upon the journal, screws passing through said nut upon opposite sides, a universal roller-bearing on the inner end of said screws, and a metallic washer upon the journal, against which said bearings impinge.

In testimony whereof I affix my signature in presence of two witnesses.

ISAAC M. WARNER.

Witnesses:
JAMES WHITTEMORE,
M. B. O'DOGHERTY.